Nov. 13, 1956 M. J. KAHAN 2,770,181

COFFEE EXTRACTING APPARATUS

Filed Jan. 4, 1952

*INVENTOR.*
MORTIMER J. KAHAN.
BY Paul A. Talbot.
*ATTORNEY.*

ســ

2,770,181

COFFEE EXTRACTING APPARATUS

Mortimer J. Kahan, New York, N. Y.

Application January 4, 1952, Serial No. 264,965

3 Claims. (Cl. 99—298)

My invention relates to a device for extracting a concentrate of coffee from ground coffee by the use of warm water.

Among the purposes and objects are to provide a system of strainers above and below the coffee mass deposited in the extractor.

Another object is to provide an extractor having an internal annulus and a cooperating peripheral strainer retainer for securing a plurality of strainer elements and to seal the elements in cooperation with said annulus as a gasket.

An object is to provide an annular flexible removable securing member such as an endless fabric band having hollow border hems, each hem having a draw string for securing a plurality of strainers to each other as a unit, one draw string above and the other draw string below the strainers, and the fabric between the hollow hems and draw strings providing a gasket to cooperate with the container or housing for the extractor to seal against leakage around the strainers.

An object is to provide an upper and lower strainer having packing means to prevent leakage around either or both of said strainers and the housing.

An object is to provide a container and housing for extracting the full flavor of coffee from the solids whereby 10 percent to 15 percent soluble solids of pure coffee concentrate is extracted.

An object is to provide a container and housing having a pair of trunnions and a frame for tilting the housing for emptying the coffee grounds by substantially inverting the housing.

A further object is to provide movable trunnion supporting means for adjusting the position of the trunnions with relation to the ends of the coffee extractor housing.

An object is to provide a convenient locking means for locking the housing at any desired predetermined position as when rotated on its trunnion mounting.

An object is to provide a container and housing for extracting pure coffee concentrate from the mass of coffee solids too heavy to be handled otherwise by manual effort.

An object is to provide a plurality of strainers each separable from each other and having a varying degree of coarseness from very fine to heavy and coarse whereby the heavy coarse strainer supports the finer strainers and the coffee mass which is too heavy to be supported by the finer strainers.

I accomplish these and other objects by the construction herein set forth and shown in the accompanying drawing which forms a part of this, my disclosure.

Figure 1:
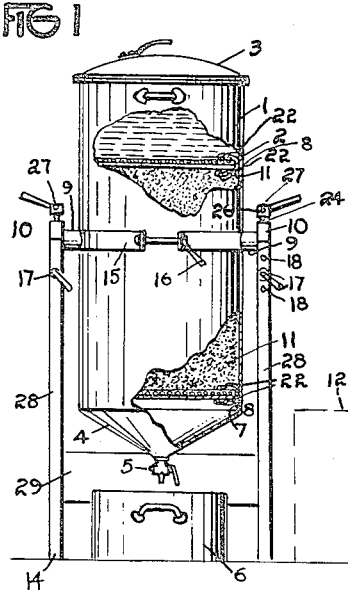
Fig. 1 is a front elevation with parts broken away to show the interior.

Coffee extractors, percolators, coffee makers and devices for home use and for making greater quantities of coffee are of a great variety and the art of making the beverage, using various devices need not be set forth in detail except as applied to extracting concentrates of pure coffee without boiling hot water.

My extractor provides a clear finished liquid coffee concentrate of a 10 to 15 percent total solids viscosity, completely clarified and filtered and ready for immediate further processing, such as dehydration to produce a finished perfect cup of pure soluble coffee or freezing said filtered liquid coffee concentrate to produce instant liquid coffee.

Dehydrating the concentrate produces pure soluble powdered coffee. The concentrate, it will be seen, may be further processed for the many new and rapidly expanding adaptations of coffee as a beverage for instant preparation and use, whether unfrozen, diluted or mixed in the cup, instant coffee depends on the concentrate extracted from the coffee bean, which is first ground before entering my extractor.

My experiments and tests, and the experiments, tests, and daily use of my extractor by many others has shown that water substantially below the boiling point of 212 degrees Fahrenheit and substantially above luke-warm, 100 degrees gives the best results.

Cold water does not extract the desired percentage or quality of concentrate and hot water, among other things, changes the taste and aroma.

My preferred method and process is to partially fill my extractor above the lower screen with granular coffee leaving a space at the top for substantially an equal weight of warm water, adding water to keep substantially an equal hydraulic pressure head on the coffee mass below causing the concentrate, while progressively increasing in viscosity, to be drained off by gravity.

The water penetrates into the coffee mass slowly at the beginning of the cycle thus driving excessive air or carbon dioxide from within the individual coffee particles down through the coffee mass, filtering screens, perforated bottom plate into the drainage chamber, the air is thus forced out continuously from the coffee mass allowing the upper weight of water to force the water down through each individual particle of coffee. The bottom drainage valve is open at all times during the extraction cycle and is used only to shut off the escape of surplus wash or residue after the basic coffee concentrate has been extracted. Starting at the top of the coffee mass the water is turned into a 1% total solids concentrate by immediate contact with the coffee particles. As this light concentrated coffee descends it slowly penetrates through each successive coffee particle of each layer of coffee and begins to pick up in viscosity and thus becomes heavier in extractable total solids in liquid form until as it reaches the filtering screens and bottom plate. The concentrate has built up viscosity through each successive cycle within the coffee mass until it reaches a 10 to 15 percent total solids concentrate.

Upon reaching the filtering screens and bottom plate the concentrate is of a fairly heavy viscosity and being forced downward through continual pressure from the concentrate above, it is forced or driven through the fine mesh screens and bottom plate into the bottom drainage chamber and out of the draining valve. The entire cycle from placing the granular coffee into the container to adding the water on top of the coffee mass to draining the finished coffee concentrate through the drain valve at the bottom of the container covers a period of two hours.

Upon drawing the desired concentrate per pound of coffee, depending on the strength and viscosity of the finished coffee concentrate desired for eventual further processing for dehydrating or freezing, the extractor is ready to be emptied. This is done tilting the extractor forward. A large can or container is placed in front of the extractor so that the wet coffee dregs are quickly emptied directly into the container and the coffee extractor and wire screen filters after being rinsed thoroughly with very hot water are ready again for immediate use within 15 to 20 minutes from the time the coffee concentrate has finished draining to the time of starting to repack the extractor with roasted granular coffee for another run thus completing the cycle of operation.

The top strainer is positioned directly on top of the coffee mass and acts as a water spreader, dispersing the water flow evenly as it enters the coffee mass and in addition retards the flow of water and prevents too rapid penetration and one sided channeling of water.

Any type of coffee grown anywhere in the world may be used in my extractor and any combination of blends and types of coffee may be used successfully. The shade or color of the roasted coffee may be a light roast or a full commercial roast depending on whether the product is used for dehydrated powdered coffee or frozen instant coffee or for flavoring ice cream, cakes and other food products. The color of the roasted coffee is also determined by the regional preference in whatever section of the country the extractor may be used to manufacture by concentrated coffee. Any color or shade of roasted coffee may be used to extract a pure liquid concentrated coffee.

In the past many attempts have been made to obtain a clear filtered polished coffee concentrate in a short period of time without continuous percolation or other methods such as pumping from one extractor to another. These methods extract a harsh bitter residue from roasted coffee because too much essence is extracted from the coffee bean thus causing a colloidal mass to hang in suspension in the concentrate, and because of over excessive extraction, through soaking or percolation extracting, the undesirable gums and oils in solution cannot be centrifuged out; they prevent the successful process of dehydration.

My method, process and apparatus overcome the previous difficulties and extract a finished liquid coffee concentrate having a 10 to 15 percent total solids viscosity, completely clarified and filtered and ready for immediate further processing such as dehydration to produce a finished perfect cup of pure soluble coffee or freezing said filtered liquid coffee concentrate to produce frozen instant liquid coffee.

Also, it has been found that by the use of my process and extractor the time cycle is of very short duration, thereby creating a savings in labor cost in producing the finished concentrate and a substantial savings in construction and basic steel cost because of the relatively small number of coffee extractors needed in a manufacturing plant to feed a single dehydrator, thus saving an overhead and rental through use of a smaller manufacturing area. A further savings in labor cost in the production of the concentrated liquid coffee is created by the fact that the finished concentrate does not require extensive pressure filtration, for 400 pounds of ground coffee the pressure through the mass being between a pound and two pounds per square inch. The extractor and process is more economical because of the quick and simple method of emptying the coffee dregs and cleaning the extractor for immediate re-use within a short period of time.

I have not attempted to show or describe all of the modifications possible but rather to set forth a preferred embodiment in sufficient detail so that one skilled in the art of commercial coffee concentrate production may understand the construction, method and process and practice its use. Modifications, it is believed, may suggest themselves after a study of this, my disclosure.

The preciseness of the detail description and the preciseness of the details of the drawing are not intended to limit the scope of my invention which is set forth in the appended claims.

Referring to the drawings I have shown by extractor apparatus as comprising a housing 1 having cylindrical sides 2, a removable top cover 3 and conical bottom 4 with a suitable drain valve 5 for continuously delivering the liquid concentrate to the receptacle 6 where it may be gathered to add to the liquid at the top of the housing or, when finished, to be further processed or shipped.

Figure 4:
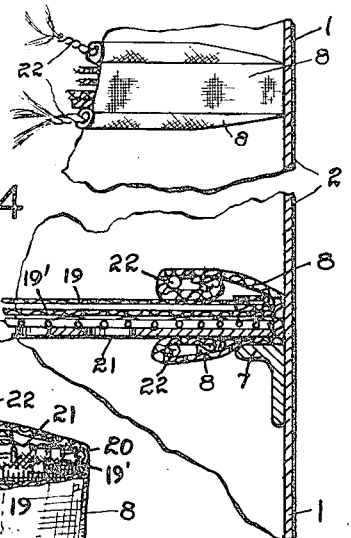
Fig. 4 is a fragmentary section of a strainer unit.
Figure 5:
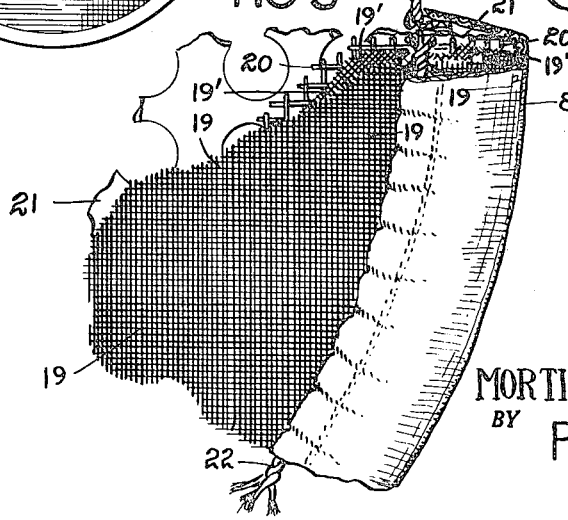
Fig. 5 is a fragmentary detail of a portion of a strainer unit.

Within the cylindrical sides 3 I have provided the narrow annulus 7 on which the lower strainers and their retainer 8 rests to seal against leakage both with respect to the annulus and also the interior surface of the cylindrical walls as shown, particularly in Fig. 4 of the drawing and as hereinafter more fully described.

Figure 2:
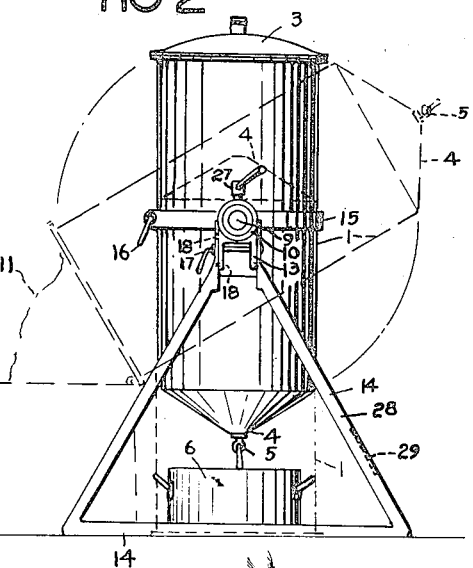
Fig. 2 is a side elevation.
Figure 3:
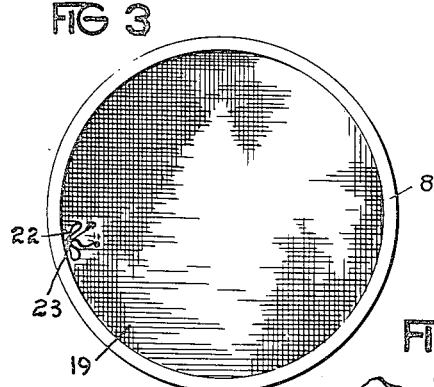
Fig. 3 is a plan view of one of the strainer units.

The housing 1 is mounted on the trunnions 9 which rotate in the bearings 10 to permit the housing to be tilted and partially inverted to empty the coffee grounds 11, as shown particularly by broken lines in Fig. 2, into the waste receptacle 12; the cover 3 being removed after extraction of the concentrate has been concluded.

The bearings 10 are preferably adjustably mounted in the vertical guides 13 of the frames 14 which are sufficiently high above the floor to substantially conform to the height of the housing 1 for shipping. The girth clamp band 15 to which the trunnions 9 are secured may be moved longitudinally on the exterior of the housing by unscrewing the clamp screw 16, thus to position the trunnions to substantially balance the housing and its contents or to secure the housing in a lowered position as when packed for shipment.

The bearings may be vertically adjusted by moving the bearing securing screw 17 from one set of holes 18 in the frame to another set. The bearing also has a plurality of holes vertically positioned to receive the screw 17 all to give the desired vertical adjustment for the bearings and housing to permit a larger or smaller receptacle 6 to be placed under the housing and to provide the desired height for filling the housing with coffee and warm water which is not less than 125 degrees and not more than 200 degrees Fahrenheit.

My strainers are of a diameter when combined with the retainer 8 to slidably fit the interior of the cylindrical housing and seal against leakage, the particles of coffee and also the concentrate. The lower retainer also seats as a gasket, held by the strainers and the mass of coffee and water above, thus to seal more tightly against leakage past the annulus which serves as a seat.

My strainers comprise fine mesh stainless steel strainers 19 and 19', the coarser strainer 20 and the heavy apertured head 21 which is suitable to carry the entire weight of the contents of the housing and to permit the concentrate to pass through. The retainer 8 is preferably of strong flexible fabric, formed like a band, having a diameter substantially equal to the diameters of the strainers and head.

The two marginal edges of the retainer 8 are a tubular hem into which the pair of draw strings 22, one in each hem, are free to move and when tightly drawn cause one of the edges of the retainer to be drawn over and the other edge under the periphery of the several strainers and head thus securing them together as a unit and also providing packing to prevent leakage around the strainers between the strainers and the cylindrical walls of the housing.

The upper and lower strainers or strainer units are substantially duplicates and each may be easily removed from the housing and each may be taken apart by removing the retainer 8, which is easily done by untying the knots 23.

To hold the housing at any desired position, upright, as when extracting the coffee concentrate, or partially inverted, as when emptying the used coffee grounds and when cleaning the extractor for its next operating cycle; to hold the housing in its desired position I have provided the clamp screws 24 and their lever handles 25, one end of which engages any one of the plurality of apertures 26 in the clamp screw heads 27.

The sides 28 of the frame 14 are held in spaced relationship by the rear gusset plate 29 so that the housing is free to rotate between the sides and to provide the space under the housing for the receptacle 6.

The size and materials used in my extractor may vary to suit the capacity, the pounds of coffee to be processed for each cycle of operation.

Having thus described a preferred embodiment of my invention, what I claim as new and desire to secure by Letters Patent is set forth in the following claims.

I claim:

1. In a device for extracting coffee concentrate having a cylindrical housing for the ground coffee and warm water and a plurality of strainers and a pair of units comprised of said strainers slidable in said housing disposed normally, one unit above the coffee and the other below the coffee to support its weight within said cylindrical housing, girthwise band retainers engaging and packing the periphery of each unit, each edge of said retainers having a tubular hem for each band, and gathering string means within each tubular hem above and below its respective unit of strainers to pack and to hold said strainers detachably together.

2. In combination, an invertable cylindrical housing for coffee and water, a plurality of strainers fitting the interior of said housing in units above and below the coffee and slidable within said housing, and girthwise detachable band retainers disposed, in part around said strainers, the edges of each of said bands being gathered above and below each unit of said strainers to removably secure said strainers in said retainers and to hold said strainers together as a unit and packing the periphery of said strainers against leakage between said strainers and the walls of said housing, whereby the strainers in each unit may be separated for cleaning and renewal by removing said retainer and unit from said housing and releasing said gathered edges.

3. A coffee extractor having a cylindrical housing for coffee and water and a plurality of strainers in units above and below the coffee fitting the interior of the housing and slidable therein, and removable girthwise band retainers for packing said strainer units from leakage, the edges of said bands of said retainers being gathered above and below the strainers of a unit of strainers and releasable to permit the strainers and band to be cleaned and renewed, having a tubular edge, and draw strings in each edge slidable therein for gathering and snugly drawing each edge of the band as above and below said strainers and for releasing said edges and said retainer, and means for detachably securing the ends of said draw strings.

References Cited in the file of this patent

UNITED STATES PATENTS

| | | | |
|---|---|---|---|
| 376,319 | Lane | Jan. 10, | 1888 |
| 871,491 | Dunlap | Nov. 19, | 1907 |
| 1,022,337 | Shaw | Apr. 2, | 1912 |
| 1,232,808 | Kalina | July 10, | 1917 |
| 1,462,322 | Casoletti | July 17, | 1923 |
| 1,535,769 | Gallardo | Apr. 28, | 1925 |
| 1,668,540 | McAllen | May 1, | 1928 |
| 1,687,095 | Jones | Oct. 9, | 1928 |
| 1,762,208 | Aborn | June 10, | 1930 |
| 1,762,209 | Aborn | June 10, | 1930 |
| 1,836,541 | Meyer | Dec. 15, | 1931 |
| 1,901,611 | Porter | Mar. 14, | 1933 |
| 1,978,074 | Bogoslowsky | Oct. 23, | 1934 |
| 2,038,119 | Masin et al. | Apr. 21, | 1936 |
| 2,084,839 | Dubois | June 22, | 1937 |
| 2,192,095 | Meyers | Feb. 27, | 1940 |
| 2,285,930 | Kahan | June 9, | 1942 |
| 2,405,751 | McMenamin | Aug. 13, | 1946 |

FOREIGN PATENTS

| | | | |
|---|---|---|---|
| 55,284 | Germany | Feb. 18, | 1891 |